United States Patent [19]

Ozaki

[11] Patent Number: 4,593,799
[45] Date of Patent: Jun. 10, 1986

[54] ONE WAY CLUTCH MECHANISM FOR BICYCLE FREEWHEEL HUB

[75] Inventor: Nobuo Ozaki, Osaka, Japan
[73] Assignee: Maeda Industries, Ltd., Osaka, Japan
[21] Appl. No.: 587,111
[22] Filed: Mar. 7, 1984

[30] Foreign Application Priority Data

Mar. 7, 1983 [JP] Japan .................. 58-37803

[51] Int. Cl.⁴ ............................................ F16D 41/36
[52] U.S. Cl. ...................... 192/46; 192/64; 192/94
[58] Field of Search ............... 192/46, 47, 64, 70.28, 192/101, 94

[56] References Cited

U.S. PATENT DOCUMENTS

| | | | |
|---|---|---|---|
| 2,008,967 | 7/1935 | Rossmann | 192/94 |
| 2,068,869 | 1/1937 | Rauen | 192/46 |
| 3,010,553 | 11/1961 | Van Der Plas | 192/64 |
| 3,306,406 | 2/1967 | Poliseo | 192/46 |
| 3,709,341 | 1/1973 | Schulz | |

Primary Examiner—George H. Krizmanich
Attorney, Agent, or Firm—Birch, Stewart, Kolasch & Birch

[57] ABSTRACT

One way clutch mechanism for a bicycle freewheel hub, which comprises a driver having one or more sprockets thereon and co-axial and relatively rotatable with respect to a stationary axle, a hub shell co-axial and relatively rotatable with respect to the axle, an inward conical clutch face formed on or with the hub shell, an internally threaded clutch member co-axially and relatively rotatably mounted on a threaded section of the driver so as to axially move back and forth; an outward conical clutch face formed on or with the clutch member, and a coil spring so arranged as to urge the clutch member axially inwardly thereby to force the outward clutch face away from the inward clutch face.

9 Claims, 11 Drawing Figures

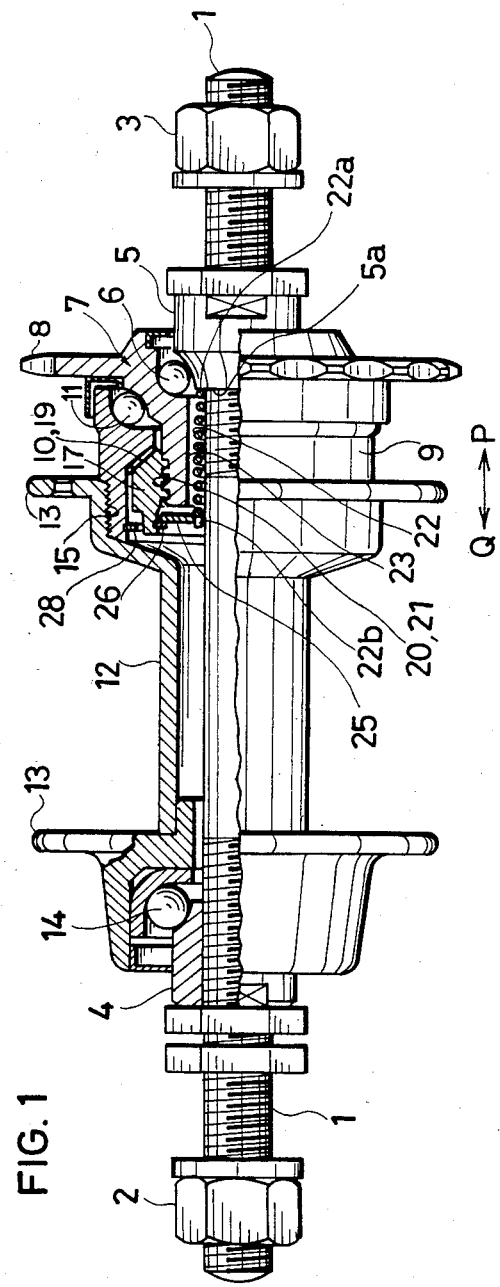
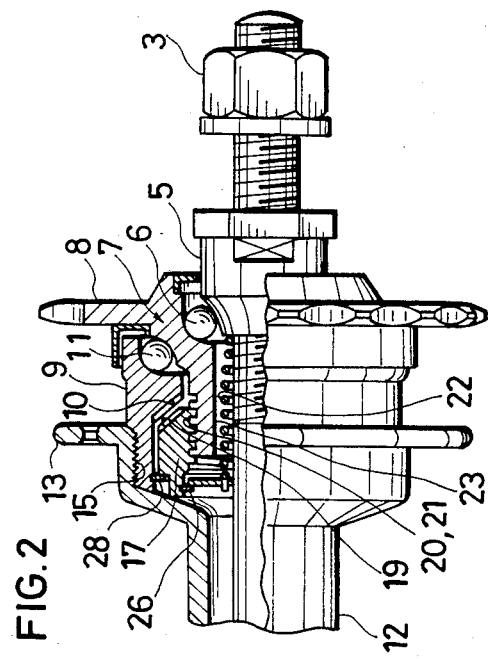

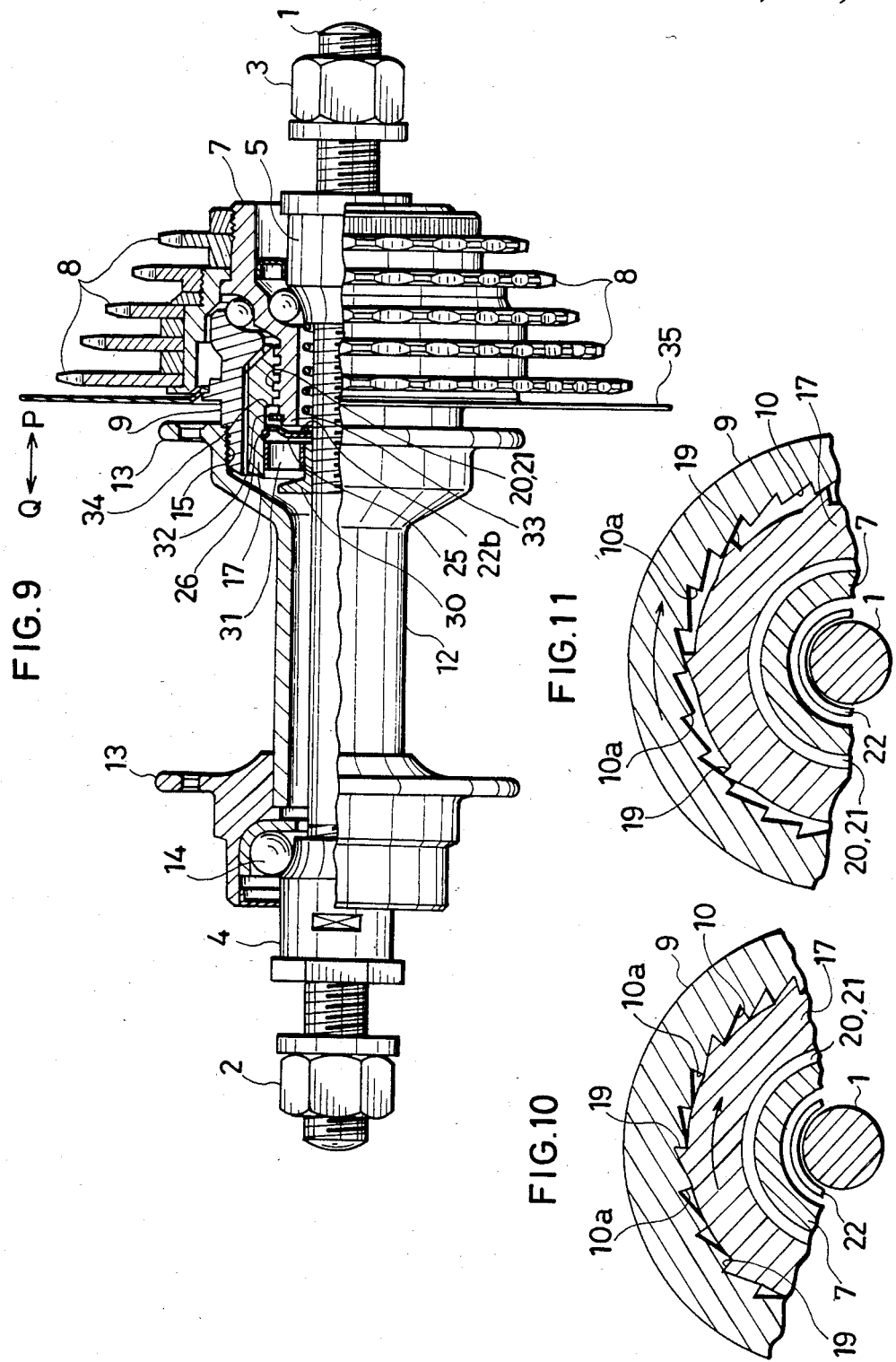

ONE WAY CLUTCH MECHANISM FOR BICYCLE FREEWHEEL HUB

BACKGROUND AND SUMMARY OF THE INVENTION

This invention relates to one way clutch mechanism for bicycle freewheel hubs, and more particularly to such a type of one way clutch mechanism that includes a pair of conical clutch faces arranged for engagement and disengagement with each other.

A typical model of the conventional one way clutch mechanism of the above type is disclosed for example in U.S. Pat. No. 3,709,341 to Schulz, wherein one conical clutch face is formed on a clutch member (coupling member) which is mounted on a driver by threads so as to move axially outwardly when the driver is rotated in a forward direction, while the other conical clutch face is formed on a hub shell, so that the driver transmits torque to the hub shell when the clutch faces are in engagement but permits free rotation of the hub shell when the clutch faces are in disengagement.

In the above conventional mechanism, the engagement between the pair of clutch faces are realized by frictional resistance and no positive and reliable means is provided for restricting undesirable relative slippage therebetween. Accordingly, for the purpose of effective torque transmission by minimizing the slippage, the tapering angles of the conical clutch faces are generally of smaller than 30° so that frictionally contact area therebetween can be increased. Further, a spring is provided in order to urge the clutch member axially outwardly to improve reliability of the operative engagement between the clutch faces.

As will be apparent from the above description, the conventional mechanism appears advantageous from the viewpoint of effective torque transmission. However, it has such a disadvantage that a quick and easy disengagement between the clutch faces is sometimes difficult to obtain because of their relatively large contact area and small tapering angles in addition to the function of the spring so arranged as to always urge the clutch member axially outwardly to force the conical clutch face of the driver against the mating clutch face of the hub shell. If disengagement between the clutch faces cannot be attained instantly, pedals continue its rotation regardless of the fact that a cyclist has stopped his pedalling operation.

It is, therefore, an object of the invention to substantially reduce the above-discussed disadvantages observed in the conventional one way clutch mechanism for bicycle freewheels.

Another object of the invention is to provide an improved one way clutch mechanism for bicycle freewheel hubs, which permits easy and quick disengagement between conical clutch faces.

A further object of the invention is to provide an improved one way clutch mechanism for bicycle freewheel hubs, which permits reliable, non-slipping engagement between conical clutch faces.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become obvious to those skilled in the art from this detailed description.

According to the present invention, there is provided one way clutch mechanism for bicycle freewheel hubs which comprises a driver having one or more sprockets thereon and relatively rotatable with respect to a stationary axle, a hub shell relatively rotatable with respect to the axle, a toothed, inward conical clutch face formed internally of the hub shell, an internally threaded clutch member relatively rotatably mounted on a threaded section of the driver so as to axially move back and forth within a limited range and having an outward conical clutch face with claws formed therewith, and a coil spring so arranged as to urge the clutch member not axially outwardly but axially inwardly so as to force the outward clutch face away from the inward clutch face, wherein the tapering angles of the inward and the outward clutch faces may be greater than 30° for better disengagement from each other and reliable engagement between the clutch faces are attained not by friction but by teeth-claws engagement. The clutch mechanism of the invention can be utilized as a known ratchet mechanism conventionally incorporated in a bicycle freewheel hub with such an advantage that the known tinkling noises can be substantially eliminated. The clutch mechanism of the invention can also be utilized as that for a freewheel hub with coaster brake.

BRIEF DESCRIPTION OF THE DRAWINGS

In the accompanying drawings:

FIG. 1 is an elevational view, partly in section on its axis, showing a freewheel hub of the invention, wherein a clutch member is in its axially outermost position;

FIG. 2 is a similar view to FIG. 1, wherein the clutch member is in its axially innermost position;

FIG. 9 is a similar view to FIG. 1, but showing another embodiment of the invention; and FIGS. 10 and 11 are fragmentary cross sectional views showing positional relations of the clutch member with respect to the cylindrical member.

DESCRIPTION OF THE PREFERRED EMBODIMENTS

Figure 3:
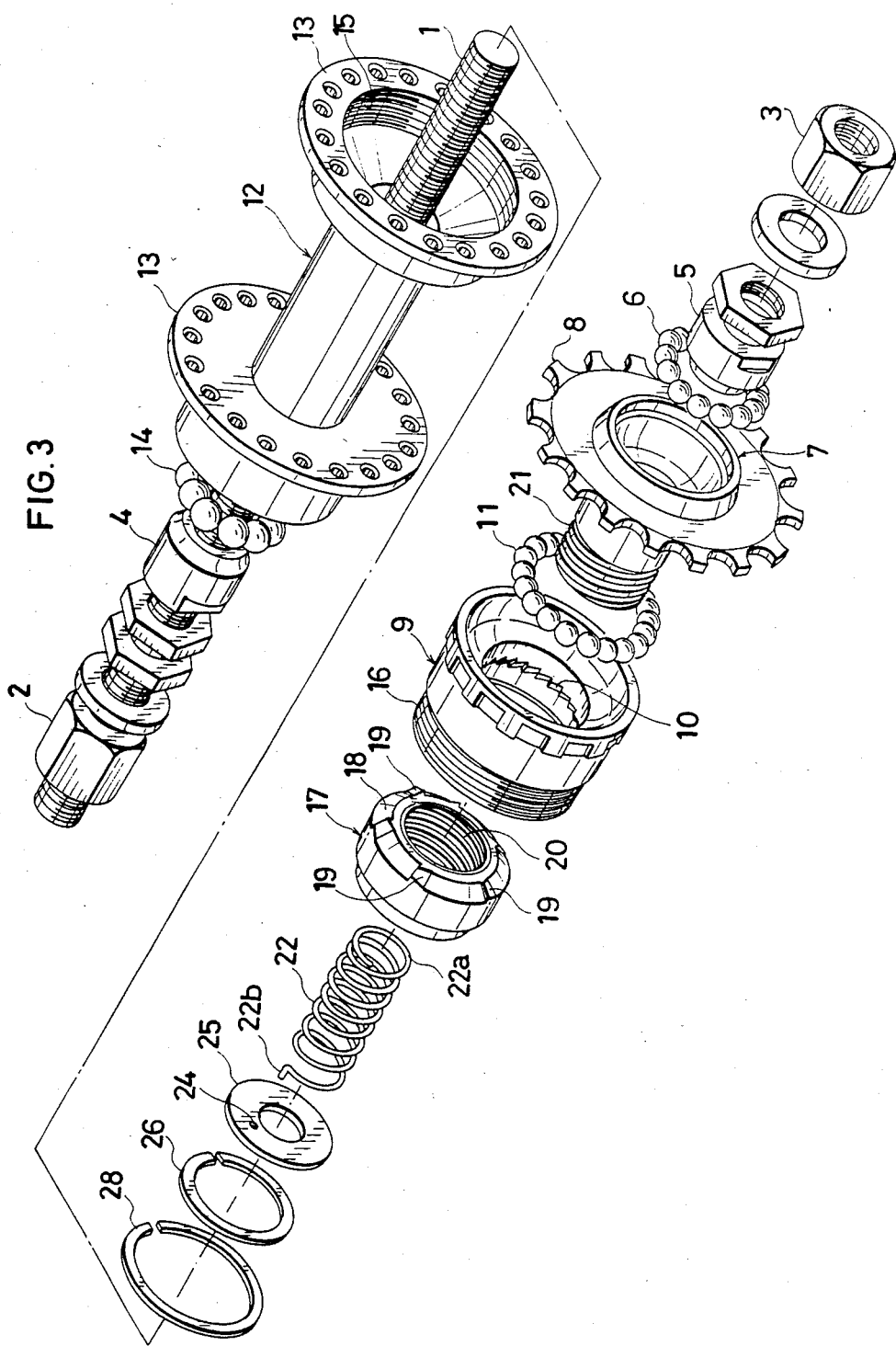
FIG. 3 is an exploded perspective view showing the structural elements of the embodiment shown in FIG. 1.

Referring now to the accompanying drawings, there is illustrated a bicycle freewheel hub assembly which is mounted on a stationary axle 1 having threaded end sections and secured to a bicycle frame (not shown) by clamping nuts 2, 3, conventionally. On the threaded end sections of the axle 1, internally threaded bearing members 4, 5 are adjustably mounted. A ball bearing 6 on the bearing member 5 rotatably supports a driver 7 which may have a known sprocket 8 formed integrally therewith as illustrated in FIGS. 1 and 2 so as to be driven by a known drive chain (not shown). It is obvious that, if desired, a plurality of sprockets 8 may be conventionally mounted on the driver 7 as illustrated in FIG. 9.

A cylindrical member 9, which has an internal, toothed conical clutch face 10, is relatively rotatable with respect to the driver 7 by means of an additional ball bearing 11 interposed therebetween.

A cylindrical hub shell 12 with a pair of known apertured spoke flanges 13 is rotatably supported by a further ball bearing 14 at its one end and integrally coupled at its other end by threads 15 to a threaded inner end section 16 of the cylindrical member 9 which is free to rotate on the ball bearing 11. Thus, the hub shell 12 is free to rotate in forward and rearward directions. In fact, however, the hub shell 12 is restricted from such free rotation by one way clutch mechanism according to the invention. More particularly, the hub shell 12 is co-rotatable with the driver 7 in a forward direction but released from such co-rotation in a rearward direction (back-pedalling direction). In other words, the hub shell 12 is so arranged that only the forward rotational movement of the driver 7 can be transmitted to the hub shell for co-rotation therewith, with the result that the hub shell 12 is free from the co-rotation when the driver 7 is rotated in the rearward direction or not in rotation. The cylindrical member 9 and the hub shell 12 may be on one piece construction, if desired.

The one way clutch mechanism of the invention includes a cylindrical clutch member 17 which is disposed between the internal circumference of the cylindrical member 9 and the external circumference of the driver 7 so as to be co-axial therewith and formed with a conical, outwardly facing clutch face 18 having a plurality of claws 19 formed therewith. The tapering angles of the conical clutch faces 10, 18 with respect to their axis may preferably be of more than 30° (about 45° in the illustated embodiments).

The teeth formed in the inward conical clutch face 10 of the cylindrical member 9 may preferably be in the form of ratchet teeth 10a, while the claws 19 of the clutch member 17 may be in such form as can be operatively engageable with the teeth 10a, so that the torque or forward rotation of the clutch member 17 can be effectively transmitted to the hub shell 12 via the cylindrical member 9. Incidentally, it is apparent that the number and the configuration of the teeth 10a and claws 19 may be modified variously and therefore should not be limited to those as illustrated.

The clutch member 17 is further formed with internal threads 20 which are engageable with external threads 21 of the driver 7, so that the clutch member 17 moves axially outwardly in the direction of an arrow P until its claws 19 come into operative engagement with the teeth 10a when the driver 7 is driven into forward rotation, while the clutch member moves axially inwardly in the direction of an arrow Q to get out of the engagement between the claws 19 and the teeth 10a.

Figure 4:
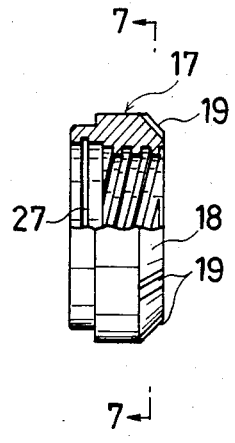
FIG. 4 is an elevational view, partly in section on its axis, showing the clutch member.

The clutch mechanism further includes a compression coil spring 22 which is disposed within an annular space 23 circumferentially formed between the driver 7 and the axle 1, surrounding the axle 1 so as to normally urge the clutch member 17 in the axial direction of the arrow Q in order to push the claws 19 away from the teeth 10a. Preferably, the coil spring 22 may be arranged so that its outer end 22a is in press contact with an annular-shaped inner end wall 5a of the bearing member 5 while its inner end 22b is in engagement with an aperture 24 formed in an annular friction disk 25 which is axially slidably mounted on the axle 1 and pressed against an outward wall of a known split stop ring 26 fixed into an annular groove 27 (FIG. 4) formed in the internal cylindrical wall of an inner end secion of the clutch member 17. Thus, the disk 25 and therefore the spring 22 are substantially prevented from rotation by friction between the disk and the stop ring, resulting in that a certain degree of resistance is given to restrict the clutch member 17 from rotation about its axis. The degree of the resistance can be adjustably varied by selecting a spring constant of the coil spring 22 and/or a friction factor between the disk 25 and the stop ring 26. In this way, the spring 22, the friction disk 25 and the stop ring 26 cooperate to urge the clutch member 17 in the axial direction Q and also to impart a certain degree of resistance for restricting the clutch member 17 from rotation about its axis.

The compression coil spring 22 may be replaced, if desired, with such a tension coil spring (not shown) disposed at the inner side of the friction disk 25 so as to pull the disk 25 axially inwardly in the direction of the arrow Q.

The friction disk 25 may be dispensed with in case where the inner end 22b of the spring 22 is directly engaged with the stop ring 26. Further, the stop ring 26 may be replaced with an internal annular flange (not shown) formed integral with the internal wall of the clutch member 17.

Figure 5:
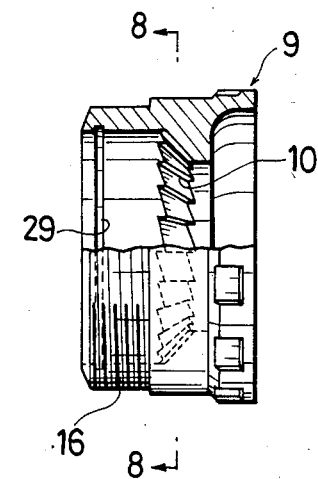
FIG. 5 is a similar view to FIG. 4, showing a cylindrical member.
Figure 6:
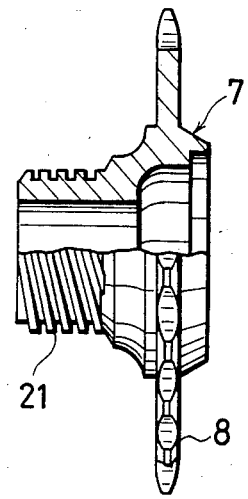
FIG. 6 is a similar view to FIG. 4, showing a driver.
Figure 7:
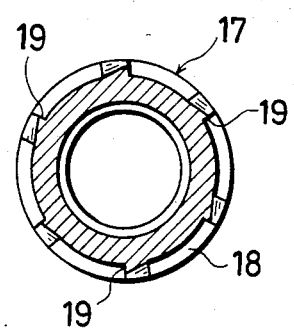
FIG. 7 is a cross section taken along the line 7—7 of FIG. 4.
Figure 8:
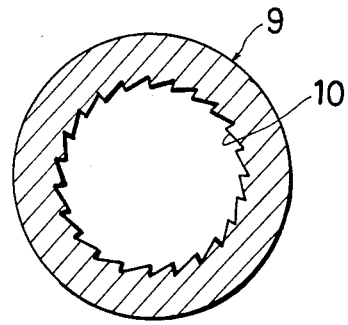
FIG. 8 is a cross section taken along the line 8—8 of FIG. 5.

A further split stop ring 28 is provided in order to prevent the clutch member 17 from its excessive axial movement in the direction of the arrow Q. Such stop ring 28 may be fixed into an annular groove 29 (FIG. 5) formed in the internal cylindrical wall of the member 9.

If desired, an additional means may be provided in order to increase the degree of resistance to be imparted to the clutch member 17 for restricting its relative rotation with respect to the stationary axle 1. Such additional means may include a flanged tubular member 30 fixedly mounted on the axle 1 and a flat-stock or flat spiral spring 31 co-axially interposed between the clutch member 17 and the tubular member 30 in such a manner that the spring 31 is relatively slidable with respect to the internal wall of the clutch member 17, as illustrated in FIG. 9. In case where such additional restricting means is provided, the inner end 22b of the coil spring 22 may be merely in press contact with the friction disk 25, as also illustrated in FIG. 9.

In the embodiment of FIG. 9, an excessive axially inward movement of the clutch member 17 may be prevented by a stop ring 32 mounted on an inward extension 33 of the driver 7, so that an internal vertical shoulder 34 formed in position with the clutch member 17 comes into contact with the stop ring 32 so as to be restricted from the excessive inward movement thereof. Incidentally, reference numeral 35 in FIG. 9 shows a known disk provided for preventing a drive chain (not shown) from unexpectedly falling off the largest one of the sprockets 8.

In operation, when the clutch member 17 is in its innermost position as shown in FIG. 2, the clutch face 18 is disengaged from the clutch face 10, and therefore, the hub shell 12 is free from the driving torque of the driver 7. In this position, the clutch member 17 is in co-rotation with the driver 7 because the clutch member 17 which is in screw engagement with the threads 21 of the driver 7, is restricted from its relative rotation with respect to the driver 7 and therefore its axially inward movement (direction Q) by means of the stop ring 28.

When the driver 7 is driven into its forward rotation, the rotation of the clutch member 17 is interrupted by the frictional resistance imparted thereto by the compression coil spring 22, the friciton disk 25 and the stop ring 26, and consequently moves by threads on the driver 7 axially outwardly in the direciton P until the clutch face 18 comes into operative engagement with the clutch face 10, as illustrated in FIG. 1, resulting in that the clutch member 17 co-rotates forwardly together with the driver 7 because the clutch face 18 is prevented from its reverse rotation with relative to the clutch face 10 as apparent from FIGS. 10 and 11. As a result, all of the driver 7, the clutch member 17, the cylindrical member 9 and the hub shell 12 are rotated together in the forward direction at the same rotational speed by a cyclist's pedalling operation. Thus, a bicycle is propelled forwardly.

On the other hand, when the cyclist stops his pedalling, the driver 7 comes to a stop. However, the cylindrical member 9 and therefore the hub shell 12 still continue their forward rotation in the direction of an arrow in FIG. 11. At this stage, there occurs a certain frictional engagement between the ratchet teeth 10a and the claws 19, which causes the clutch member 17 to be forcibly co-rotated with the cylindrical member 9 and therefore with the hub shell 12, resulting in that the clutch member 17 is rotated on the threads 21 to moved axially inwardly in the direction Q until its clutch face 18 is completely disengaged from the clutch face 10 and restores its position shown in FIG. 2.

Since the clutch member 17 is always urged axially inwardly by the spring force of the spring 22, a less resistance is imparted to the clutch member 17 when it is relatively rotated forwardly on the threads 21 to axially move in the direciton Q, as compared to when it is relatively rotated reversely on the threads 21 to axially move in the direction P. Thus, the co-rotation of the clutch member 17 with the hub shell 12 can be performed quite smoothly, and the disengagement of the clutch can be attained quite easily. This advantage can also be obtained when the driver 7 is intentionally driven into reverse rotation by a cyclist's back-pedalling operation, because the clutch member 17 is restricted from its relative rotation with respect to the stationary axle 1 by a certain resistance developed by the spring action of the spring 22 and always urged axially in the direction Q by the spring 22.

The present invention being thus described, it will be obvious that same may be varied in many ways. Such variations are not to be regarded as a departure from the spirit and scope of the invention, and all such modifications as would be obvious to one skilled in the art are intended within the scope of the following claims.

I claim;

1. A ratchet type one way conical clutch mechanism for a bicycle freewheel hub, comprising
    a driver having at least one sprocket thereon and relatively rotatable with respect to a stationary axle,
    a hub shell relatively rotatable with respect to said axle and carrying an inward conical clutch face formed,
    an internally threaded clutch member co-axially and relatively rotatably mounted on a threaded section of said driver so as to be movable axially back and forth on said threaded section,
    said clutch member having an outward conical clutch face,
    a disk which is mounted on said axle so as to be axially slidable on said axle within a limited range and which is disposed internally of said clutch member,
    and a compression coil spring means co-axially mounted on said axle for cooperation with said disk so as to urge said clutch member axially inwardly for disengagement of said outward conical clutch face from said inward conical clutch face.

2. The clutch mechanism as defined in claim 1, which further includes
    an internally threaded bearing member adjustably mounted on a threaded section of said axle,
    a first stop ring secured to an internal wall of said clutch member, said disk being in press contact with said first stop ring by said spring means, and
    said spring means extending between an inner end wall of said bearing member and said disk.

3. The clutch mechanism as defined in claim 1, wherein means is provided for restricting said spring means from its relative rotation about an axis of said axle.

4. The clutch mechanism as defined in claim 1, wherein a second stop ring is provided externally of said clutch member for restricting excessive axially inward movement of said clutch member.

5. The clutch mechanism as defined in claim 1, wherein
    a cylindrical member is fixedly connected to one end of said hub shell; and
    said inward conical clutch face is formed on said cylindrical member.

6. The clutch mechanism as defined in claim 1, wherein
    said conical inward clutch face has ratchet teeth formed therewith, and
    said conical outward clutch face has at least one claw formed therewith.

7. The clutch mechanism as defined in claim 5, wherein
    tapering angles of said inward and said outward clutch faces with respect to said axis of said axle are larger than 30°.

8. The clutch mechanism as defined in claim 1, wherein
    means is provided for restricting said clutch member from its relative rotation with respect to said axle.

9. The clutch mechanism as defined in claim 7, wherein
    said means includes a flat-stock spring having its part disposed in slidable contact with said clutch member.

* * * * *